United States Patent [19]

Ferrantelli

[11] 4,378,467
[45] Mar. 29, 1983

[54] AUDIO AMPLIFIER
[75] Inventor: Salvatore Ferrantelli, Valley Stream, N.Y.
[73] Assignee: Roanwell Corporation, New York, N.Y.
[21] Appl. No.: 165,093
[22] Filed: Jul. 1, 1980
[51] Int. Cl.³ ............................................. H04M 1/60
[52] U.S. Cl. ................................... 179/1 A; 179/1 P; 179/81 B
[58] Field of Search .................... 179/1 A, 1 P, 1 VC, 179/1 VE, 1 VL, 1 HF, 81 B

[56] References Cited
U.S. PATENT DOCUMENTS
3,691,311 9/1972 Wilson ............................... 179/81 B Primary Examiner—Joseph A. Popek
Attorney, Agent, or Firm—Cooper, Dunham, Clark Griffin & Moran

[57] ABSTRACT

An amplifier for use in an audio communication circuit between a dynamic microphone and an output line. The amplifier produces a signal at the output having characteristics similar to those of a signal from a carbon microphone, i.e., noise is suppressed in the output line when no speech signal is present. The amplifier includes a main channel including two stages coupled through two arms of a T-pad. In the absence of a voice signaal from the microphone, the third arm of the T-pad is effectively grounded through a saturated transistor and thereby holds the main channel in a low gain condition. A signal integrator responds to the output of the first stage and integrates excursions of the voice signal above a predetermined level. As the integrated signal increases, it shifts the transistor gradually away from its saturated condition, thereby gradually increasing the gain of the main channel in response to initiation of a voice signal at the microphone. Similarly, the gain of the main channel is gradually decreased upon termination of a voice signal at the microphone. All parts of the amplifier circuit are energized from the output line.

4 Claims, 1 Drawing Figure

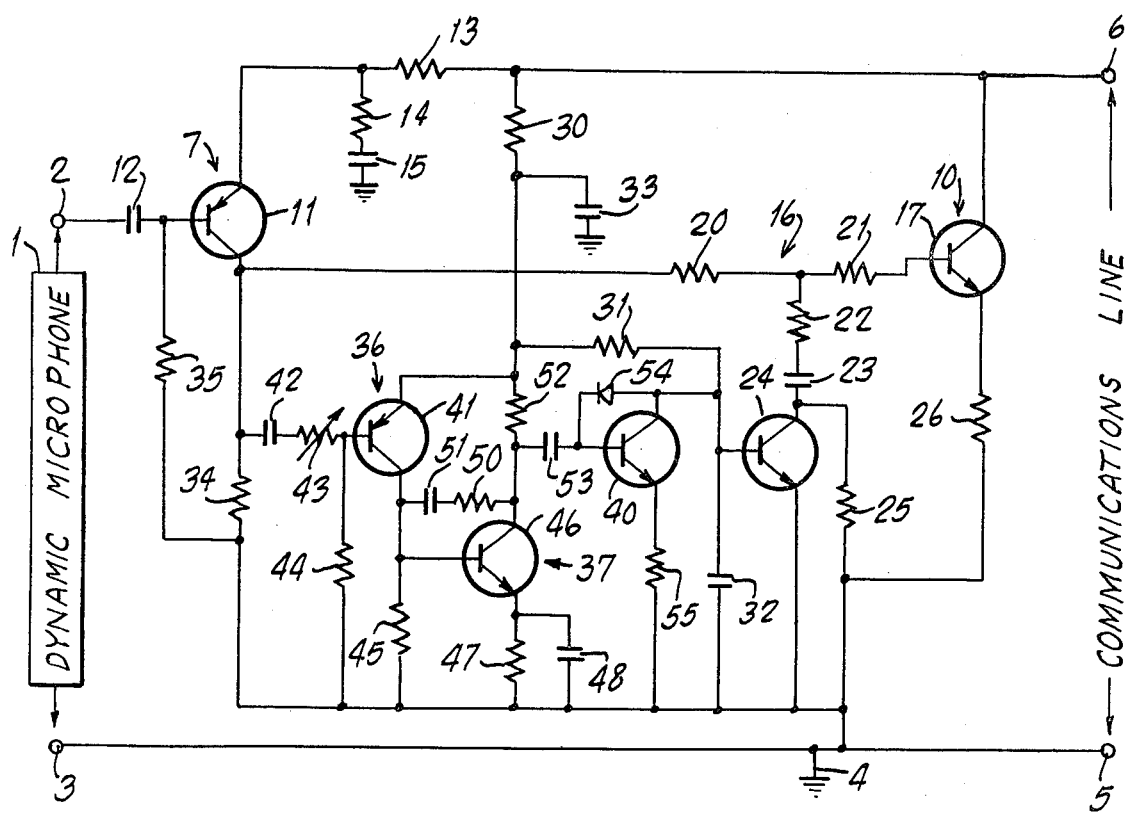

AUDIO AMPLIFIER

BRIEF SUMMARY OF THE INVENTION

Carbon microphones have a characteristic of insensitivity to background noise. Noise is low in the absence of a voice signal impinging directly on the microphone. Sensitivity increases when a voice is present and gradually drops when the voice signal terminates, so that during the interval between voice transmissions, the background noise is effectively suppressed. Carbon microphones are sensitive to low frequency vibrations such as those caused by rough roads. When such microphones are used on automotive vehicles, that sensitivity may cause variations in gain and even interruptions of the output signal under rough road conditions. It is therefore desirable to use dynamic microphones for vehicular communications.

It has been proposed to provide amplifiers for telephone circuits useful with an input from a dynamic microphone and having noise suppression characteristics similar to those of a carbon microphone. The patent to Noonan, et al., U.S. Pat. No. 3,536,838 shows such an amplifier. However, the change in gain of that amplifier occurs rapidly and may have a distracting effect on the listener at the other end of the telephone line. Furthermore, the change in gain may be accompanied by a high frequency "ping" which is also distracting.

It has also been proposed, in connection with high fidelity recorders and sound reproducers, to provide amplifier circuits which suppress background noise by attenuating the signal in the absence of an input above a predetermined amplitude, increasing the gain (or decreasing the attenuation) gradually in response to a signal of greater amplitude, and gradually decreasing the gain upon termination of that greater amplitude signal. See for example the patent to Tomita et al., U.S. Pat. No. 3,798,559, which shows a circuit providing gain increases and decreases which may be controlled as to the time required. However, the Tomita et al. circuit is intended for use with a power supply including a fixed potential, identified as Vec in the patent, and having a potential in the circuit fixed by a Zener diode 41. In typical telephone circuits, all the electrical energy is supplied over the output line except for any electrical energy that may be generated at the microphone. The electrical energy supplied over the output line may vary over a wide range of potential (6.5–9.5 volts).

The present invention is intended to provide in a telephone circuit an amplifier which will produce the required low gain in response to noise at the input, a slow (7-15 millisecond) rise in gain upon initiation of a voice signal input and a slower (75-150 millisecond) decrease in gain at the termination of the voice signal. This characteristic is provided in a circuit that derives its only power from the signal output line as in typical telephone circuits, which line is subject to a substantial potential variation (6.5–9.5 volts).

This amplifier circuit has a main channel including first and second stages coupled through two arms of a T-pad. The third arm of the T-pad is coupled through a transistor to the grounded conductor of the line. That transistor is operated in saturated condition in the absence of an input signal and effectively grounds the third arm of the T-pad, thereby maintaining the main channel in a low gain condition. The transistor is maintained saturated by a biasing circuit including a resistance and a capacitance and energized from the output line. A second transistor is connected to that biasing circuit and is operable to shift the first transistor out of the saturated region and thereby to increase the gain of the main channel. The conductivity of the second transistor is controlled by an integrating circuit connected to the output terminal of the first stage of the main channel and effective to integrate the excursions of the input signal above a presettable level.

DRAWING

The single FIGURE of the drawing is a wiring diagram of an amplifier circuit constructed in accordance with the present invention.

DETAILED DESCRIPTION

A dynamic microphone 1 is connected across the input terminals 2 and 3 of the amplifier shown in the drawing. Terminal 3 is grounded as shown at 4 and is connected to the output terminal 5. The opposite output terminal 6 of the communications line is connected to a source of direct current electrical energy (not shown).

The main amplifier channel connects input terminal 2 and output terminal 6 and includes a first stage generally indicated at 7 and a second stage generally indicated at 10. The first stage 7 includes a transistor 11 having a base electrode coupled to the input terminal 2 through a capacitor 12. The emitter electrode of transistor 11 is coupled to the output terminal 6 through a resistor 13. The emitter electrode is also coupled to ground through a resistor 14 and a capacitor 15. The collector electrode is connected to ground through a resistor 34 and the base electrode is connected to ground through a resistor 35. The collector electrode of transistor 11 is coupled through a T-pad 16 to the base electrode of a transistor 17 in the second stage 10. The T-pad 16 comprises three resistors 20, 21, 22. The common junction of the resistors is connected through resistor 22 and a capacitor 23 to the collector electrode of a transistor 24 whose emitter electrode is connected directly to ground. A resistor 25 connects the collector electrode of transistor 24 to ground.

The collector electrode of transistor 17 is connected directly to output terminal 6. The emitter electrode of transistor 17 is connected to ground through a resistor 26.

A biasing circuit for the base electrode of transistor 24 may be traced from output terminal 6 through a resistor 30, a resistor 31 and a capacitor 32. The common junction of resistors 30 and 31 is coupled to ground by a capacitor 33.

The collector electrode of transistor 11 is also connected to a signal integrating means including two amplifier stages 36 and 37. The amplifier stage 36 includes a transistor 41. The collector electrode of transistor 11 is coupled through a capacitor 42 and a variable resistor 43 to the base electrode of transistor 41. That base electrode is also connected to ground through a resistor 44. The emitter electrode of transistor 41 is connected to the common junction of resistors 30 and 31. The collector electrode of transistor 41 is connected to ground through a resistor 45. It is also connected directly to the base electrode of a transistor 46 whose emitter electrode is connected to ground through a resistor 47 and a parallel capacitor 48. The collector electrode of the transistor 46 is connected through a resistor 50 and a capacitor 51 to the collector electrode of transistor 41. It is also connected through a resistor 52 to the common junction of resistors 30 and 31. The collector electrode of transistor 46 is coupled through a capacitor 53 to the base electrode of a transistor 40. A diode 54 is connected between the collector and base electrodes of transistor 40 and is poled oppositely to the impedance of the transistor 40 between those two electrodes. The emitter electrode of transistor 40 is connected to ground through a resistor 55.

The energized line connected to the output terminal 6 is the power supply for the entire amplifier circuit shown. That line is connected through resistor 13 to transistor 11, and through resistor 30 to provide a common power supply for transistors 41, 46 and 40 for the biasing circuit 31, 32 of transistor 24.

OPERATION

In the absence of an input signal, the capacitor 32 is charged through resistors 30 and 31 and holds the base of transistor 24 at a potential such that that transistor is saturated and provides an effective ground for alternating components of the signal appearing at the common terminal of T-pad 16. The main amplifier channel including the stages 7 and 10 is thereby held in a low gain condition. That condition persists as long as the charge is held on the capacitor 32. There is no effective path for direct current through the base of transistor 40, so that that transistor is essentially an open circuit until an alternating signal of sufficient amplitude is impressed on the base through the capacitor 53.

The signal appearing at the output of the first amplifier stage 7 is transmitted through transistors 41 and 46 and appears at the collector electrode of transistor 46. When that signal exceeds a preselected value determined by the setting of the variable resistor 43, then transistor 40 is turned on and is effective to discharge the capacitor 32. The positive going part of the signal passes through the transistor 40 and the negative going part of the signal passes through the diode 54. Thus, the transistor 40 and capacitor 32 effectively integrate that part of the voice signal which has exceeded the threshold determined by resistor 43 by providing a discharge path for the capacitor 32. That discharge path is continuous as long as the voice signal continues. If it persists for a sufficiently long time, the capacitor 32 will be completely discharged, the transistor 24 will be shifted to its open condition, and the main amplifier channel including stages 7 and 10 will be shifted to a high gain condition.

The shift from the low gain to the high gain condition is gradual, and is initiated by an increase in the amplitude of the input signal above the threshold value established by the resistor 43. The length of time required for the main channel to reach its high gain condition, after that threshold value is exceeded, is dependent upon the resistance of resistor 55, which limits the current through transistor nel to reach its high gain condition, after that threshold value is exceeded, is dependent upon the resistance of resistor 55, which limits the current through transistor 40 when the latter is turned on.

When those signals cease, the capacitor 32 starts to charge again through resistor 31 and gradually builds up the potential at the base of transistor 24 until that transistor is in its saturated condition and the main channel comprising stages 7 and 10 is returned to its low gain condition. These gradual changes from the low gain to the high gain condition and vice versa are very comfortable to the listener on the telephone circuit and do not involve any accompanying high frequency "ping."

The circuit illustrated is intended for use in an automotive telephone communication system, where the dynamic microphone is carried in a car and is thus subject to acoustical and electrical noise from various sources and mechanical vibration. The communication line is designed to operate at a nominal potential of 8 volts, and the circuit operates satisfactorily at any line potential between 6.5 and 9.5 volts. The time required to change the circuit from the low gain condition to the high gain condition in response to initiation of a voice signal at the microphone is nominally 10 milliseconds but may vary between 7-15 milliseconds. The time delay between the termination of a voice signal at the microphone and the restoration of the amplifier to its low gain condition is nominally 125 milliseconds, but may vary between 75-150 milliseconds.

All the transistors illustrated are silicon transistors, which may be of the NPN or PNP type as indicated by the symbols in the drawing.

The following table gives the values for the resistors and capacitors shown in the drawing.

Capacitor 12—33 Mf
Resistor 13—3.3K
Resistor 14—10 Ohm
Capacitor 15—47 Mf
Resistor 20—1.8K
Resistor 21—12K
Resistor 22—150 Ohm
Capacitor 23—33 Mf
Resistor 25—47K
Resistor 26—100 Ohm
Resistor 30—3.3K
Resistor 31—10K
Capacitor 32—22 Mf
Capacitor 33—47 Mf
Resistor 34—4.7K
Resistor 35—680K
Capacitor 42—1 Mf
Resistor 43—120K Max.
Resistor 44—1 M
Resistor 47—820 Ohm
Capacitor 48—8 Mf
Resistor 50—56K
Capacitor 51—0.01 Mf
Resistor 52—2.2K
Capacitor 53—1 Mf
Resistor 55—150 Ohm

I claim:
1. An amplifier for connection in an audio communication circuit between a dynamic microphone and an output line having two conductors, one of which is at a reference potential and the other is energized with direct current, comprising:
  (a) a main amplifier channel energized from said other conductor and including first and second stages connected between an output terminal of the microphone and the energized conductor of the output line;
  (b) means coupling the first stage output to the second stage input including two arms of a T-pad;
  (c) a first transistor having three electrodes including a first electrode coupled to the thrid arm of the T-pad and a second electrode connected to the conductor at the reference potential;
  (d) means energized from said other conductor for biasing the third electrode of the transistor to saturation, said transistor being effective when saturated to provide a low impedance connection be- tween the third arm and said reference potential conductor and thereby to hold the main channel in a low gain condition, said biasing means including a resistor connected between said other conductor and the third electrode and a capacitor connected between the third electrode and the reference potential conductor and charged from said output line through said resistor; and (e) signal integrating means energized from said output line and having an input coupled to the output of said first stage and an output coupled to said third electrode, said signal integrating means including:

(1) means effective when the signal from the microphone exceeds a predetermined noise level to discharge said capacitor at a rate varying as a function of the integrated excess of the signal over said predetermined noise level, the discharge of said capacitor being effective to shift the transistor gradually away from the saturated condition and thereby gradually to increase the gain of the main channel in response to a voice signal at the microphone;

(2) a second transistor having a first electrode connected to the third electrode of said first transistor;

(3) a diode connected between said first electrode and a second electrode of said second transistor and poled oppositely to the polarity of the transistor between said first and second electrodes; and (4) a resistor connecting the third electrode of the second transistor to said reference potential conductor, effective to limit the current flow through the second transistor in its active mode and thereby to limit the rate of discharge of the capacitor and hence the rate of increase of the gain in said main channel.

2. An amplifier as in claim 1, in which said signal integrating means further includes:

(a) third and fourth amplifier stages energized from said other conductor; and (b) a capacitor coupling the output of said fourth amplifier stage to the second electrode of the second transistor.

3. An amplifier as in claim 2, including a common energizing connection from said other conductor to the third and fourth amplifier stages and the biasing means.

4. An amplifier as in claim 2, including a variable resistance in the input of the third amplifier stage, said variable resistance being operable to set said predetermined noise level.

* * * * *

UNITED STATES PATENT AND TRADEMARK OFFICE
CERTIFICATE OF CORRECTION

PATENT NO. : 4,378,467

DATED : March 29, 1983

INVENTOR(S) : SALVATORE F. FERRANTELLI

It is certified that error appears in the above-identified patent and that said Letters Patent are hereby corrected as shown below:

Col. 3, lines 56-59, delete duplicated material commencing with "nel" in line 56 through "transistor" in line 59.

Col. 4, line 62, "thrid" should read -- third --.

Signed and Sealed this

Seventh Day of June 1983

[SEAL]

Attest:

DONALD J. QUIGG

Attesting Officer

Acting Commissioner of Patents and Trademarks